United States Patent
Song et al.

(10) Patent No.: US 7,486,596 B2
(45) Date of Patent: Feb. 3, 2009

(54) METHOD AND APPARATUS COMPENSATING FOR TILT

(75) Inventors: Byung-youn Song, Suwon-si (KR); Jong-koog Lee, Seoul (KR); Dong-ryeol Lee, Seoul (KR); Pyong-yong Seong, Seoul (KR); Kyung-ui Park, Seoul (KR); Dong-won Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 552 days.

(21) Appl. No.: 11/089,535

(22) Filed: Mar. 25, 2005

(65) Prior Publication Data
US 2005/0249077 A1 Nov. 10, 2005

(30) Foreign Application Priority Data
Mar. 25, 2004 (KR) ...................... 10-2004-0020522

(51) Int. Cl.
G11B 7/00 (2006.01)
(52) U.S. Cl. ............... 369/44.32; 369/53.19; 369/53.34; 369/53.23
(58) Field of Classification Search ........................ None
See application file for complete search history.

(56) References Cited

U.S. PATENT DOCUMENTS

| | | | | |
|---|---|---|---|---|
| 6,115,333 A * | 9/2000 | Igarashi | ................... | 369/44.27 |
| 6,282,161 B1 * | 8/2001 | Son et al. | ................. | 369/53.19 |
| 6,426,925 B1 * | 7/2002 | Watanabe | ................ | 369/44.32 |
| 6,577,094 B2 * | 6/2003 | Ohtsu et al. | .................. | 318/696 |
| 6,791,927 B2 * | 9/2004 | Yamanaka | ............... | 369/53.19 |
| 2003/0142598 A1 * | 7/2003 | Chou et al. | .............. | 369/44.32 |

FOREIGN PATENT DOCUMENTS

| | | |
|---|---|---|
| JP | 60-66340 | 4/1985 |
| JP | 62-31039 | 2/1987 |
| JP | 63-261542 | 10/1988 |
| JP | 1-253838 | 10/1989 |
| JP | 08-171734 | 7/1996 |
| JP | 2002-358679 | 12/2002 |
| JP | 2003-281761 | 10/2003 |

* cited by examiner

Primary Examiner—Peter Vincent Agustin
(74) Attorney, Agent, or Firm—Staas & Halsey LLP

(57) ABSTRACT

A method and apparatus for compensating tilt. The tilt compensation method includes: obtaining one of a jitter best, an RF envelope, and a focus DC offset (FODC) from a detection signal of the ROM data region and determining whether the obtained value is within a tolerance range; and obtaining an initial skew compensation value using the obtained value when the obtained value is within the tolerance, changing the magnitude of current applied to an actuator designed to perform driving in at least three-axis directions to drive an objective lens of an optical pickup assembly in a radial tilt direction when the obtained value is not within the tolerance range, and repeating the obtaining of one of the jitter best, the RF envelope, and the FODC and changing the magnitude of the current until the obtained value is within the tolerance range.

15 Claims, 5 Drawing Sheets

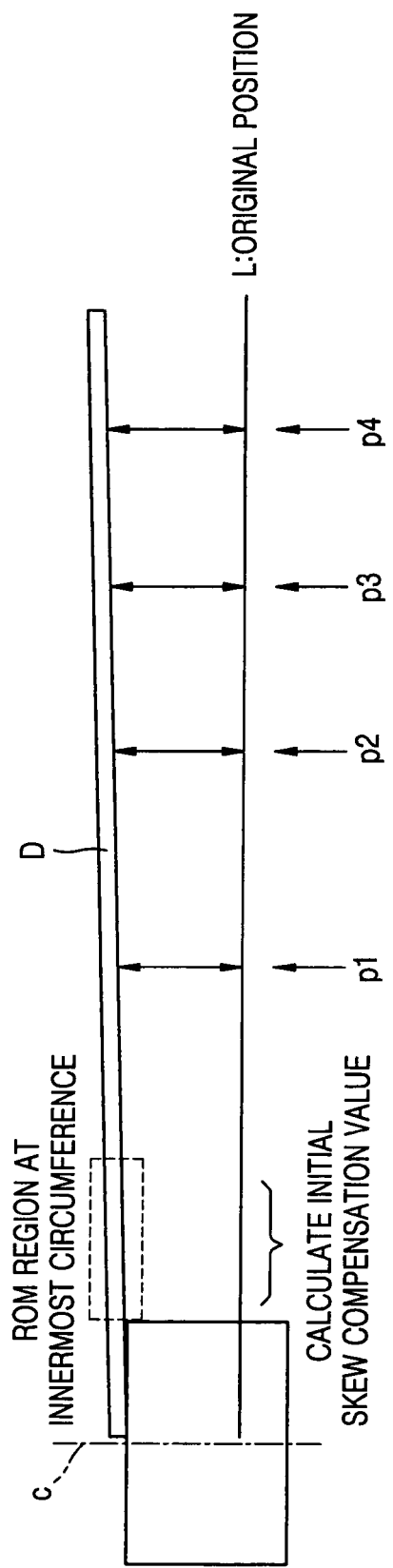

METHOD AND APPARATUS COMPENSATING FOR TILT

CROSS-REFERENCE TO RELATED APPLICATIONS

This application claims the benefit of Korean Patent Application No. 10-2004-0020522, filed on Mar. 25, 2004, in the Korean Intellectual Property Office, the disclosure of which is incorporated herein in its entirety by reference.

BACKGROUND OF THE INVENTION

1. Field of the Invention

Embodiments of the present invention relate to an optical recording and/or reproducing method and apparatus, and more particularly, to methods and apparatuses compensating for tilt and an optical recording and/or reproducing apparatus implementing the same.

2. Description of the Related Art

A typical optical pickup assembly includes an optical pickup system having a light source, an objective lens, a photodetector, and an actuator for driving the objective lens.

An optical recording and/or reproducing apparatus records information and/or reproduces information on and/or from an optical information storage medium by moving an optical pickup assembly. The optical pickup assembly can be mounted on a shaft of a disc loading device installed in a deck (hereinafter called a "deck shaft") in a radial direction of the optical information storage medium.

To properly record and/or reproduce information, the amount of tilt of an objective lens, relative to an optical information storage medium, should be within a predefined tolerance range. Accordingly, skew adjustment is performed by adjusting the position of the deck shaft, in radial and tangential directions, on the deck when assembling an optical recording and/or reproducing apparatus. This mechanical skew adjustment process is commonly called a second deck skew adjustment. Similarly, skew adjustment made during the assembly of the optical pickup assembly is commonly called a first skew adjustment.

Meanwhile, a tilt servo control is performed to compensate for a tilt of the objective lens relative to the optical information storage medium. Tilt servo control can be achieved by generating a tilt error signal. However, since it is difficult to generate a tilt error signal under the current technological conditions, when the optical pickup assembly is not optimized for tilt compensation, a DC tilt servo control can be performed to compensate for any initial tilt, e.g., in the case of a DVD.

When reproducing a prerecorded optical information storage medium, such as a DVD-ROM, a ROM signal can be read from the optical information storage medium, a vale of jitter best or RF envelope can thereby be obtained at about 4 to 5 points on the medium while moving the optical pickup assembly from an inner circumference of the medium toward an outer circumference. The amount of DC compensation can then be pre-calculated based on this value. Here, the pre-calculated amount of DC compensation corresponds to a focus DC offset (FODC).

Based on data obtained by evaluating the pre-calculated amount of DC compensation and a best skew point (unique to each optical pickup) of an optical pickup using an evaluator, a tilt of the deck shaft can be compensated for in radial and tangential directions.

However, this approach cannot provide accurate compensation because the FODC may vary when the deck shaft moves inward or outward in a radial direction. A distance by which an optical pickup actuator is driven in a focus direction may also increase.

The problem becomes more severe with a recording apparatus. That is, for a prerecorded DVD disc, a jitter best or an RF envelope can be detected when reading recorded pits, and current can then be applied to an actuator for tilt compensation. Jitter best corresponds to when a measured jitter is within a predefined tolerance range.

However, since it is not possible to obtain the jitter best or RF envelope for an unrecorded DVD disc, as shown in FIG. 1, a FODC value is measured at several points on the disc when moving from the inner to outer circumferences of the disc in order to measure and compensate for an initial tilt amount before recording. A tilt angle is obtained using the measured FODC value and used to compensate for the initial tilt amount. In this way, in the case of the unrecorded DVD disc, a tilt servo control is performed using the FODC value.

According to the conventional approach, mechanical misadjustment may occur when a second deck skew adjustment is performed in a direction opposite to the direction of the tilt resulting from the measured FODC value, as shown in FIG. 1.

Since the second deck skew adjustment is initially made only between the deck and a test disc available from each manufacturer, it leads to a second deck skew in an unrecorded disc mounted on an optical recording and/or reproducing apparatus in actual use, increasing the amount of a tilt.

In FIG. 1, L' and L" represent the original position of the deck shaft and the position of the deck shaft subjected to the second deck skew adjustment, respectively. D' and c' denote a disc and a rotation axis of the disc D', respectively. p1', p2', p3' and p4' denote locations of the disc D' where measurements of a FODC value are made.

When mechanical misadjustment occurs due to the second deck skew adjustment, the conventional tilt compensation method cannot provide accurate compensation because the distance by which an actuator is driven in the focus direction increases. Furthermore, when the actuator is highly nonlinear in the focus direction, it is difficult to seek an accurate value of FODC due to the possibility of mechanical misadjustment.

SUMMARY OF THE INVENTION

Embodiments of the present invention provide a tilt compensation method and apparatus capable of compensating for a tilt without a second deck skew adjustment and an optical recording and/or reproducing apparatus implementing the same.

According to an aspect of the present invention, there is provided a method of compensating for a tilt in an optical recording and/or reproducing apparatus, the method including: determining whether an optical information storage medium inserted into the optical recording and/or reproducing apparatus has a ROM data region and is appropriate for application of the method; performing a seek operation on the ROM data region when the inserted optical information storage medium is appropriate for applying the method; detecting the ROM data region; obtaining one of a jitter best, an RF envelope, and a focus DC offset (FODC) from a detection signal of the ROM data region and determining whether the obtained value is within a tolerance range; and obtaining an initial skew compensation value using the obtained value when the obtained value is within the tolerance range, changing the magnitude of current applied to an actuator designed to perform driving in at least three-axis directions to drive an objective lens of an optical pickup assembly in a radial tilt direction when the obtained value is not within the tolerance range, and repeating obtaining of one of the jitter best, the RF envelope, and the FODC and the changing of current until the obtained valued is within the tolerance range.

Current can be applied to the actuator so that the objective lens is driven in the radial tilt direction and/or additional current can be applied to the actuator in such a way as to improve the characteristics of the detection signal of the ROM data region in order to detect the ROM data region.

The inserted information storage medium can be a recordable-type unrecorded or recorded medium or a ROM-type medium, and the method may further include obtaining one of a jitter best, an RF envelope, and FODC or a tilt angle calculated from the FODC at a plurality of points while moving the optical pickup assembly from inner to outer circumferences of the optical information storage medium in order to provide active tilt compensation at each position of the optical pickup assembly.

The optical information storage medium can be a recordable-type unrecorded medium, and the method may further include obtaining a FODC or a tilt angle calculated from the FODC at a plurality of points while moving the optical pickup assembly from inner to outer circumferences of the optical information storage medium in order to provide active tilt compensation at each position of the optical pickup assembly.

The initial skew compensation value may be used as an initial value from innermost to outermost circumferences of the optical information storage medium.

The obtaining of the initial skew compensation value may be performed each time when a new optical information storage medium is inserted into the optical recording and/or reproducing apparatus, and the obtained initial skew compensation value can be used as an initial value until the inserted optical information storage medium is removed.

The optical information storage medium appropriate for application of the method can be one of an optical information storage medium having ROM data recorded at the innermost circumference and an optical information storage medium having ROM data for initial skew compensation.

According to another aspect of the present invention, there is provided an optical recording and/or reproducing apparatus including: an optical pickup assembly; a signal processor that processes a signal detected by the optical pickup assembly; and a controller that controls the entire system, wherein a tilt of an objective lens relative to an optical information storage medium is compensated for by a tilt compensation method of the present invention.

The optical recording and/or reproducing apparatus may also be compatible with DVD family optical information storage media.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates a tilt compensation method, according to an embodiment of the present invention.

DETAILED DESCRIPTION OF THE PREFERRED EMBODIMENTS

Figure 1:
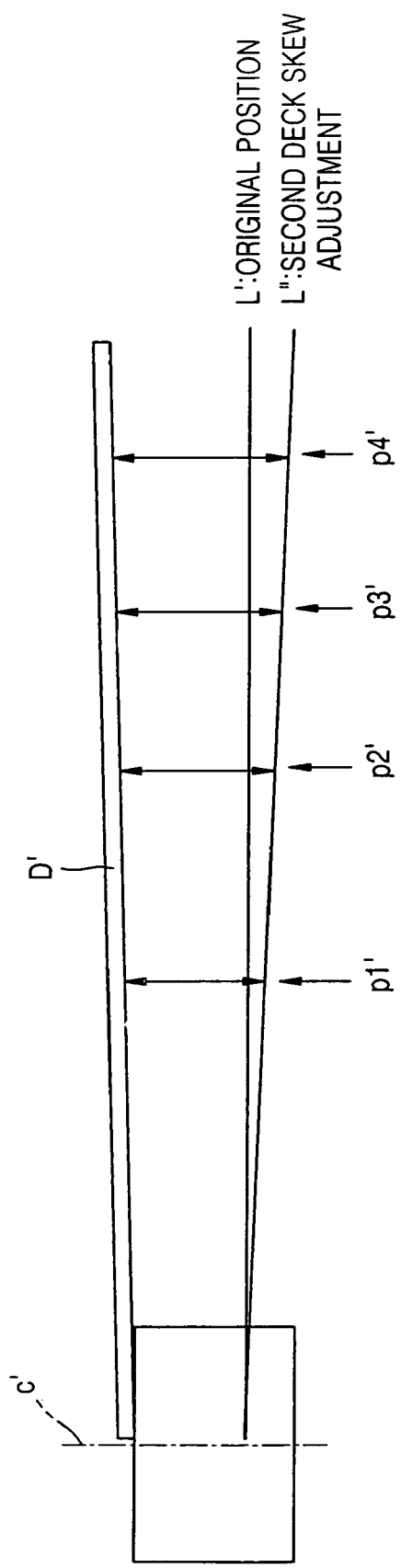
FIG. 1 illustrates a conventional method of compensating for a tilt of an unrecorded disc.

Reference will now be made in detail to embodiments of the present invention, examples of which are illustrated in the accompanying drawings, wherein like reference numerals refer to the like elements throughout. The embodiments are described below to explain the present invention by referring to the figures.

Embodiments of the present invention are based on features that a ROM region exists at an innermost circumference of an unrecorded medium, such as a DVD±R/RW or DVD-RAM, and an actuator designed for tilt control is used in an optical pickup assembly for the medium.

The actuator is designed to perform driving, including focusing driving and tracking driving, along at least two-axis directions. An optical recording and/or reproducing apparatus for a recordable disc or a DVD, or higher capacity disc, uses an actuator designed to perform driving along at least three-axis directions, that is, in a tilt direction, and in particular, in a radial tilt direction as well as in tracking direction and focus direction.

Thus, an optical recording and/or reproducing apparatus employing a tilt compensation technology, according to an embodiment of the present invention, can include an actuator designed to perform driving in at least three-axis directions. A tilt compensation method, according to an embodiment of the present invention, can include compensating for a tilt using a tilt actuator when initially mounting a disc, thereby eliminating the need for a second mechanical skew adjustment operation required in the aforementioned conventional tilt compensation method. Furthermore, method embodiments may also not include the aforementioned first mechanical skew adjustment operation.

Figure 2:
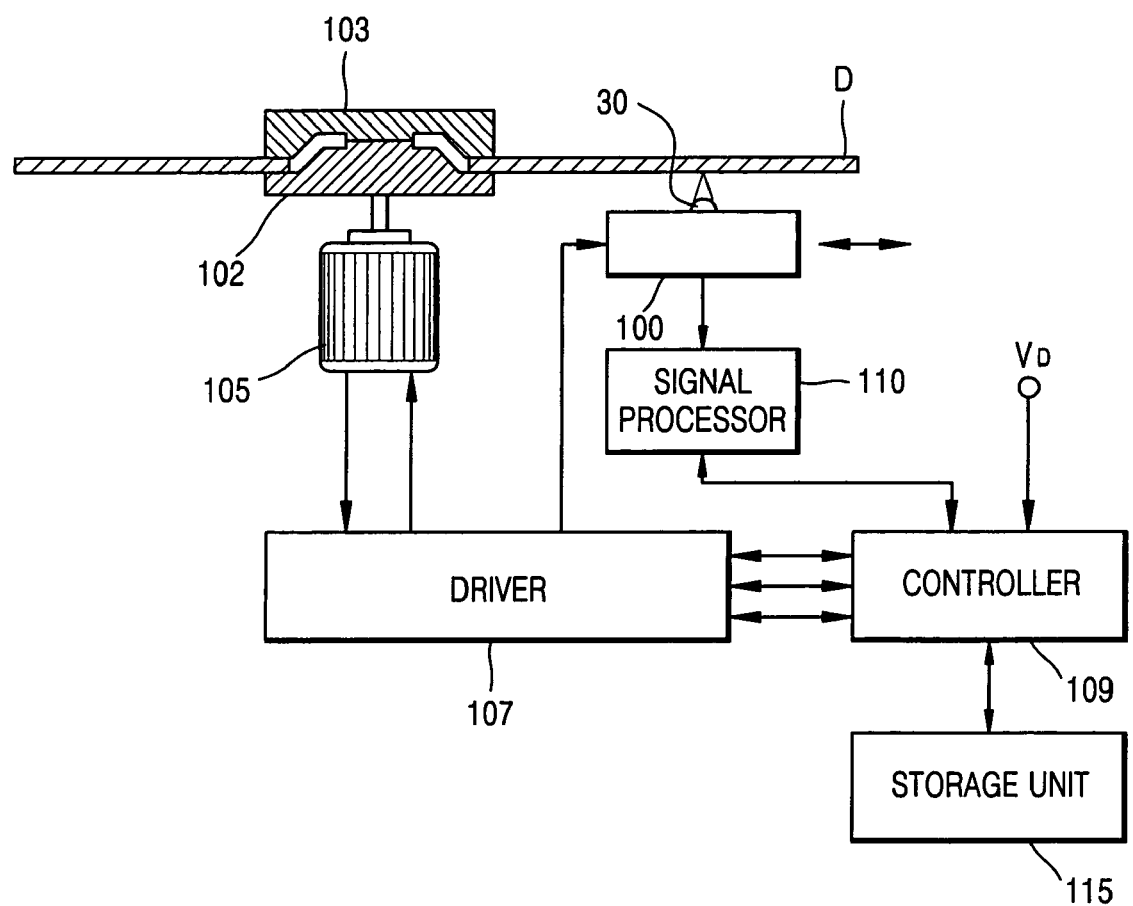
FIG. 2 illustrates an optical recording and/or reproducing apparatus in which a tilt compensation is performed, according to an embodiment of the present invention.

Referring to FIG. 2, an optical recording and/or reproducing apparatus, according to an embodiment of the present invention, in which a tilt compensation is performed includes a spindle motor 105 that rotates an optical disc D, i.e., the optical information storage medium, an optical pickup assembly 100 that is installed movably along a radial direction of the optical disc D and reproduces information and/or records information from and/or on the optical disc D, a driver 107 that drives the spindle motor 105 and the optical pickup assembly 100, a signal processor 110 that processes a signal detected by the optical pickup assembly 100, and a controller 109 that controls the entire system including focusing, tracking, and/or tilt servos of the optical pickup assembly 100. Here, reference numerals 102 and 103 denote a turntable and a clamp for chucking the optical disc D, respectively.

The optical pickup assembly 100 may include an optical system with an objective lens 30 that focuses a beam emitted by a light source onto the optical disc D and an actuator for driving the objective lens 30. The actuator is a tilt actuator designed to perform driving in at least three-axis directions.

A beam reflected from the optical disc D can be detected by a photodetector mounted in the optical system and photoelectrically converted into an electrical signal that is then processed by the signal processor 110.

The signal processor 110 processes a detection signal of a ROM data region of the disc D in order to obtain at least one of a jitter best, an RF envelope, and a focus DC offset (FODC) or a tilt angle calculated from the FODC value. In some embodiments of the present inveniton the jitter best is preferably obtained. The signal processor 110 or the controller 109 may determine whether the obtained value is within a tolerance range provided in the specification of the optical recording and/or reproducing apparatus. The signal processor 110 processes a focus error signal, a tracking error signal, and/or a tilt error signal from a signal detected from the disc D. The resulting signals output from the signal processor 110 are then input to the controller 109.

The driver 107 controls the rotation speed of the spindle motor 105, amplifies the input signal, and drives the optical pickup assembly 100. The controller 109 may control the entire system such that a tilt of the optical recording and/or reproducing apparatus, with respect to an inserted disc D, is compensated for by a tilt compensation method, according to embodiments of the present invention, and that information is recorded and/or reproduced on and/or from the inserted disc D.

When the disc D inserted into the optical recording and/or reproducing apparatus has a ROM data region, and is adequate for application of the tilt compensation methods of the present invention, the controller 109 allows the driver 107 to move the optical pickup assembly 100 to the ROM data region and perform a seek operation on the ROM data region.

Furthermore, when one of a jitter best, an RF envelope, or a FODC obtained from a detection signal of the ROM data region is within a tolerance range, the controller 109 obtains an initial skew compensation value based on the jitter best, the RF envelope, or the FODC and stores the initial skew compensation value in a storage unit 115. Conversely, when the same value is out of the tolerance range, the controller 109 controls the driver 107 so that the objective lens 30 of the optical pickup assembly 100 is driven in a radial tilt direction in an attempt to find a value within the tolerance range.

Once an initial skew of the optical recording and/or reproducing apparatus has been compensated for, according to the initial skew compensation value, the controller 109 also obtains a value that can be used for additional tilt compensation at a plurality of points when moving the optical pickup assembly 100 from the inner to outer circumferences of the disc D, thereby providing active tilt compensation for each position of the optical pickup assembly 100.

Here, when an unrecorded disc is inserted into the optical recording and/or reproducing apparatus, a FODC can be detected at a plurality of points on the disc. When the inserted disc is recorded at least once, or it is a ROM type disc, at least one of a jitter best, an RF envelope, and a FODC can be detected at the plurality of points, and stored in the storage unit 115 or a separate storage (not shown), and used for active tilt compensation at each position of the optical pickup assembly 100 during optical recording and/or reproducing.

For example, the controller 109 may send focus servo, tracking servo, and/or tilt servo commands, which may have been adjusted based on the error signals received from the signal processor 110, back to the driver 107, thus allowing the optical pickup assembly 100 to perform focusing, tracking, and/or tilting servo operations.

Figure 3:
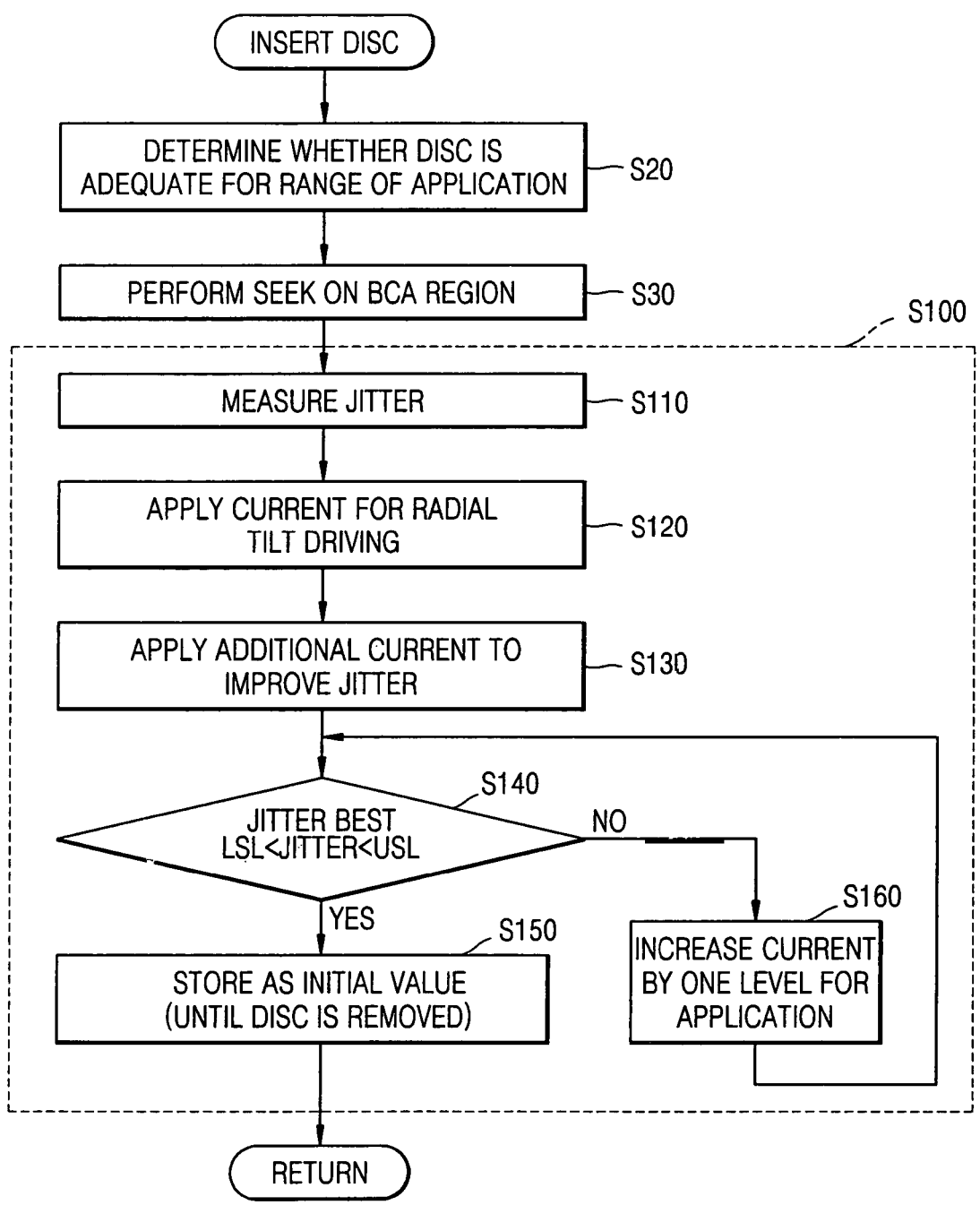
FIGS. 3 and 4 are flowcharts schematically illustrating tilt compensation processes performed by an optical recording and/or reproducing apparatus, according to embodiments of the present invention.
Figure 4:
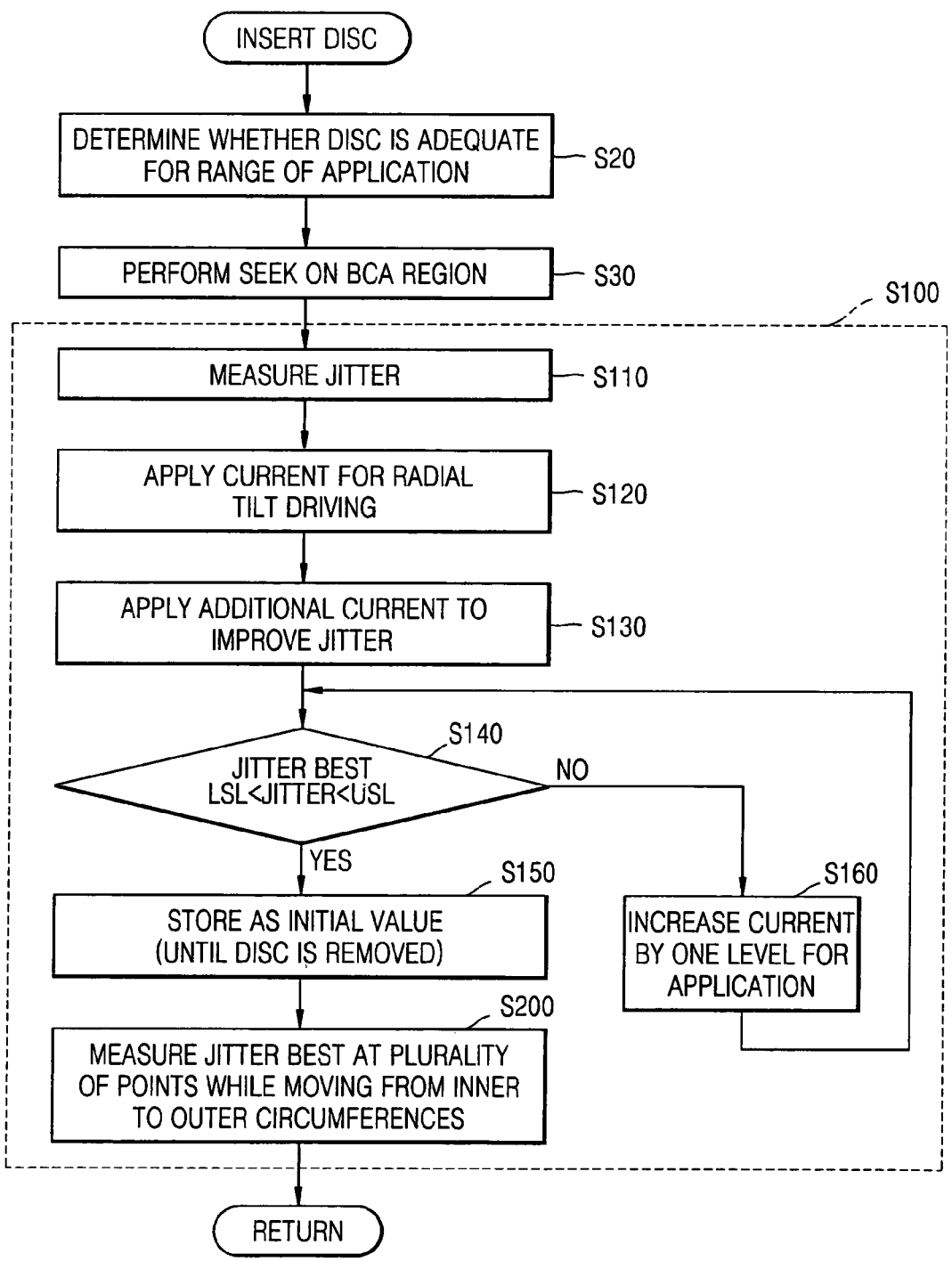

FIGS. 3 and 4 are flowcharts schematically illustrating tilt compensation processes performed by an optical recording and/or reproducing apparatus, according to embodiments of the present invention, and FIG. 5 illustrates a tilt compensation method according to an embodiment of the present invention.

Referring to FIG. 3, when a disc D is inserted into an optical recording and/or reproducing apparatus, in operation S10, the optical recording and/or reproducing apparatus determines whether the inserted disc D is appropriate for application of a tilt compensation method of the present invention, in operation S20. The disc appropriate for application of a tilt compensation method of the present invention may be a disc having a ROM region at the innermost circumference or a disc having ROM data for initial skew compensation recorded thereon.

A recordable disc has ROM data recorded at the innermost circumference. However, if the recordable disc has no ROM data region, a disc having ROM data for initial skew compensation may be used as a recordable disc.

The tilt compensation method, according to embodiments of the present invention, can be applied regardless of whether the disc is an unrecorded disc, a disc having marks recorded at least once, or a ROM-type disc. For example, the methods may be applied to both unrecorded and recorded DVD±R/RW/RAM and DVD-ROM.

In operation S30, when the inserted disc D is appropriate, a seek is performed on a region having ROM data formed at the innermost circumference, e.g., a burst cutting area (BCA).

In operation S110, upon being moved to the innermost circumference of the disc D in this way, the optical pickup assembly 100 reads ROM data to measure a jitter, an RF envelope, or a FODC. While FIGS. 3 and 4 show that the jitter is measured by reading the ROM data, the RF envelope or FODC may also/alternately be measured.

In operation S120, current for tilt driving is applied so that an actuator is driven in positive and/or negative radial direction. Additional current for tilt driving can be applied in such a way as to improve a jitter, in operation S130. A jitter can be measured continuously while the current for tilt driving is being applied.

Then, it can be determined, in operation S140, whether the measured jitter is within a tolerance range, that is, at the jitter best level. Here, a jitter value between lower specification limit (LSL) of the optical recording and/or reproducing apparatus and upper specification limit (USL) is determined as being a jitter best.

When the jitter value is measured as a jitter best, the jitter value is stored in a storage unit such as a registry as an initial skew compensation value, in operation S150.

When the jitter value is not measured as a jitter best, the magnitude of current for tilt driving applied to the actuator is changed by a predetermined amount (for example, by increasing the magnitude by one level), in operation S160, and then it is determined whether the jitter value is at the jitter best level. The magnitude of the current applied to the actuator is adjusted at least once until the jitter value reaches the jitter best level.

Here, another optical synthetic signal, such as an RF envelope, may be used instead of the jitter best in obtaining the initial skew compensation value, when the RF envelope measured on the ROM region is between the LSL and USL. Alternatively, an FODC measured on the ROM region may be used, instead of the jitter best or RF envelope.

As described above, for example, the ROM data region located at the innermost circumference of the disc or ROM data for initial skew compensation may be used to obtain the initial skew compensation value.

The operation S100 of obtaining the initial skew compensation value can be performed each time a disc is mounted on a disc tray, or a disc stored inside a cartridge is inserted, in the optical recording and/or reproducing apparatus, and the obtained initial skew compensation value is used as an initial value until the disc is removed, e.g., through ejection of the disc cartridge or opening of the disc tray.

An initial skew is compensated for by using the obtained initial skew compensation. The initial skew, that is, a tilt of an optical disc relative to an objective lens of the optical pickup assembly 100 can be compensated for by adjusting current for tilt driving of the actuator within the optical pickup assembly 100 using the initial skew compensation value. The initial skew compensation value can then be continuously used as an initial value in compensating for a DC offset from the innermost to the outermost circumferences of the optical disc.

A new initial skew compensation value is set each time a new disc is loaded into the optical recording and/or reproducing apparatus. Obtaining an initial skew compensation value and compensating for an initial skew in this way eliminates the need for a skew adjustment process, in particular, the aforemnentioned second skew adjustment, required by the conventional tilt compensation methods, thereby preventing mechanical misadjustments from second deck skew adjustments.

Furthermore, because embodiments of the present invention perform tilt compensation by driving the actuator designed to perform tilt driving, the aforementioned processes of a first skew adjustment may also be omitted when assembling the optical pickup assembly 100.

The operation of recording information and/or reproducing information on and/or from an inserted disc may be performed while the optical recording and/or reproducing apparatus compensates for a tilt of the objective lens relative to the optical disc by driving the actuator based on the initial skew compensation value thus obtained.

Meanwhile, to actively provide an accurate tilt compensation even when an actuator is nonlinear or a disc is curved, tilt compensation methods according to embodiments of the present invention may further include measuring one of jitter best, RF envelope, and FODC (operation S200) at a plurality of points on the disc while moving the optical pickup assembly 100 from inner to outer circumferences, as illustrated in FIG. 4. The measured value can be used in actively compensating for a tilt at each position of the optical pickup assembly 100. The FODC corresponds to a tilt DC.

In FIG. 5, L denotes the original position of a deck shaft, D denotes a disc, and c denotes the rotation axis of the disc D. p1, p2, p3 and p4 denote locations of the disc D where measurements of one of jitter best, RF envelope, and FODC may be made.

For example, when an unrecorded disc is inserted into an optical recording and/or reproducing apparatus, a tilt of the unrecorded disc relative to an objective lens can be compensated for by the measured FODC value or a tilt angle obtained by an arc tangent of a FODC value at each measurement position. Here, the tilt angle at each position corresponds to a tilt angle of a disc relative to an objective lens of an optical pickup assembly.

The measured FODC values or tilt angles obtained from the FODC values may be stored in a storage unit such as a registry. These values may be stored in the same storage unit together with the initial skew compensation value or in a separate storage space.

During recording of an unrecorded disc, embodiments of the present invention allow for active tilt compensation at each position of the optical pickup assembly 100 using a FODC value or a tilt angle obtained from the FODC value stored in the storage unit, for example.

As described above, by compensating for a tilt of an unrecorded disc relative to an objective lens using the FODC value, embodiments of the present invention can provide accurate tilt compensation even when an actuator is nonlinear or a disc is curved.

Meanwhile, even when a recorded disc or a ROM type disc is inserted into the optical recording and/or reproducing apparatus, it is possible to provide a tilt compensation by detecting a FODC value at a plurality of locations while moving the optical pickup assembly from the inner to the outer circumferences of the disc. In this case, either a jitter best or an RF envelope may be used instead of the FODC value for tilt compensation.

As described above, using one of a FODC value measured at a plurality of positions, a tilt angle calculated from the FODC value, a jitter best, and an RF envelope allows accurate tilt compensation even when a nonlinear actuator and/or curved disc is used.

Tilt compensation methods of the present invention eliminate the need for a second deck skew adjustment, thus preventing mechanical misadjustment. This also prevents the driving distance by which the actuator is driven in a focus direction from increasing, thereby achieving an accurate tilt compensation when an actuator is highly nonlinear in the focus direction.

The present invention eliminates the need for a second deck skew adjustment process, thereby preventing mechanical misadjustment due to the second deck skew adjustment while lowering the manufacturing costs due to a simple assembling process. Furthermore, the tilt compensation method allows a user of an optical recording and/or reproducing apparatus to reset an optimal value as an initial value for all discs used, thereby increasing user satisfaction. This is because optimal tilt compensation can be performed using an initial skew compensation value detected each time a new disc is loaded into the optical recording and/or reproducing apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of compensating for a tilt in a recording and/or reproducing apparatus, the method comprising:
    obtaining one of a jitter best, an RF envelope, and a focus DC offset (FODC) from a detection signal of a ROM data region of a medium, as an obtained value;
    determining whether the obtained value is within a tolerance range; and
    obtaining an initial skew compensation value using the obtained value when the obtained value is within the tolerance range, and changing a magnitude of current applied to an actuator performing driving in at least three-axis directions to drive an objective lens of an optical pickup assembly in a radial tilt direction when the obtained value is not within the tolerance range and repeating the obtaining of the one of the jitter best, the RF envelope, and the FODC and the changing of the magnitude of the current until the obtained value is within the tolerance range,
    wherein the medium is a recordable-type unrecorded medium, and the method further comprises obtaining an FODC or a tilt angle calculated from an FODC at a plurality of points while moving the optical pickup assembly from inner to outer areas of the optical information storage medium in order to provide active tilt compensation at each position of the optical pickup assembly.

2. The method of claim 1, further comprising:
determining whether the medium inserted into the recording and/or reproducing apparatus is appropriate for the method; and
performing a seek operation on the ROM data region when the inserted medium is appropriate for the method.

3. The method of claim 1, wherein the medium is appropriate for application of the method if the medium comprises a ROM data recorded at an innermost area and/or the medium comprises ROM data for initial skew compensation.

4. The method of claim 1, wherein the medium is an optical information storage medium and the recording and/or reproducing apparatus is an optical recording and/or reproducing apparatus.

5. The method of claim 1, wherein current is applied to the actuator to drive the objective lens in the radial tilt direction and/or additional current is applied to the actuator to improve characteristics of a detection signal of the ROM data region in order to detect the ROM data region.

6. The method of claim 1, wherein the medium is a recordable-type unrecorded or recorded medium or a ROM-type medium, and the method further comprises obtaining one of a jitter best, an RF envelope, and FODC or a tilt angle calculated from an FODC at a plurality of points while moving the optical pickup assembly from inner to outer areas of the medium in order to provide active tilt compensation at each position of the optical pickup assembly.

7. The method of claim 1, wherein the initial skew compensation value is used as an initial value for innermost to outermost areas of the medium.

8. The method of claim 1, wherein the obtaining of the initial skew compensation value is performed each time a medium is inserted into the recording and/or reproducing apparatus, and the obtained value is used as an initial value until the inserted medium is removed.

9. An optical recording and/or reproducing apparatus comprising:
an optical pickup assembly;
a signal processor to processes a signal detected by the optical pickup assembly; and
a controller to control the optical pickup assembly and signal processor,
wherein a tilt of an objective lens of the optical pickup assembly, relative to an optical information storage medium, is compensated for by the tilt compensation method of claim 1.

10. The apparatus of claim 9, wherein the ROM data region is detected by applying current to the actuator so that the objective lens is driven in the radial tilt direction and/or applying additional current to the actuator to improve characteristics of a detection signal for the ROM data region.

11. The apparatus of claim 9, wherein the information storage medium is a recordable-type unrecorded or recorded medium or a ROM-type medium, and one of a jitter best, an RF envelope, and FODC or a tilt angle calculated from a FODC obtained at a plurality of points while moving the optical pickup assembly from inner to outer areas of the optical information storage medium to provide active tilt compensation at each position of the optical pickup assembly.

12. The apparatus of claim 9, wherein the initial skew compensation value is used as an initial value from innermost to outermost areas of the optical information storage medium.

13. The apparatus of claim 9, wherein the obtaining of the initial skew compensation value is performed each time a new optical information storage medium is inserted into the optical recording and/or reproducing apparatus, and the obtained value is used as an initial value until the inserted optical information storage medium is removed.

14. The apparatus of claim 9, wherein the optical information storage medium is appropriate for applying the method of claims 1 if the optical information storage medium comprises a ROM data recorded at an innermost area or the optical information storage medium comprises ROM data for initial skew compensation.

15. The apparatus of claim 9, wherein the optical information storage medium is compatible with DVD family optical information storage media.

* * * * *

UNITED STATES PATENT AND TRADEMARK OFFICE
CERTIFICATE OF CORRECTION

PATENT NO. : 7,486,596 B2 Page 1 of 1
APPLICATION NO. : 11/089535
DATED : February 3, 2009
INVENTOR(S) : Byung-youn Song et al.

It is certified that error appears in the above-identified patent and that said Letters Patent is hereby corrected as shown below:

Column 10, Line 32, change "claims" to --claim--.

Signed and Sealed this

Seventh Day of April, 2009

JOHN DOLL
*Acting Director of the United States Patent and Trademark Office*